TWO PHASE CLOCK PULSE GENERATOR EMPLOYING DELAY LINE HAVING INPUT-OUTPUT MEANS AND CHARACTERISTIC IMPEDANCE TERMINATION MEANS AT EACH END

Filed Oct. 4, 1966

Inventor:
GERALD P. BENEDICT
John V. Regan
Attorney 3,441,751
Patented Apr. 29, 1969

3,441,751

TWO PHASE CLOCK PULSE GENERATOR EMPLOYING DELAY LINE HAVING INPUT-OUTPUT MEANS AND CHARACTERISTIC IMPEDANCE TERMINATION MEANS AT EACH END

Gerald P. Benedict, Northridge, Calif., assignor to Radio Corporation of America, a corporation of Delaware Filed Oct. 4, 1966, Ser. No. 584,227
Int. Cl. H03k 1/18
U.S. Cl. 307—262 6 Claims The present invention relates to timing arrangements and, in particular, to two phase timing or clock generators.

Figure 1:
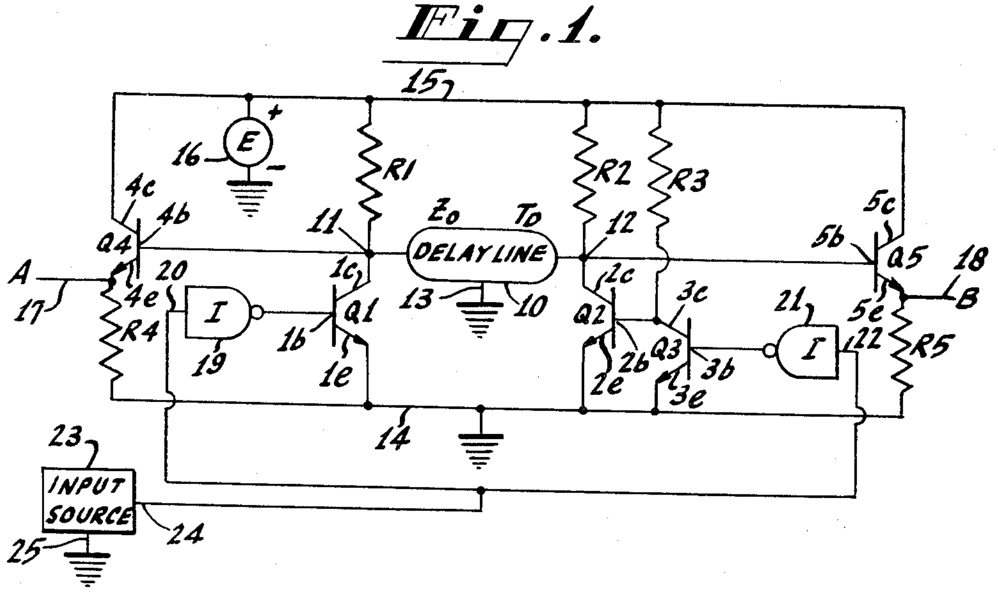

Timing arrangements are useful in such systems as communications, computers, video, radar and the like, wherein there is need for synchronizing the various parts of the system. In many such systems, the timing arrangement is such that information-bearing signals occur at specified rates. In digital systems, for example, these rates are sometimes called "bit rates." The period of the bit rate is known as a "bit period." Orderly processing of the information signals by the system often requires the use of clock pulses which regularly occur during successive bit periods. In an electronic computer system, for example, the clock pulses can be employed to control logical operations, shifting and counting operations, READ-WRITE cycles, and other operations required by a particular computing system. In controlling these operations, it is often desirable to provide a pair of pulse trains or sequences which are 180° out-of-phase and positioned such that one pulse sequence regularly occurs at the onsets of the the bit periods while the other sequence regularly occurs at the midpoints of the bit periods.

Accordingly, an object of the present invention is to provide a novel two phase clock pulse generator.

The invention is specifically related to the type of clock generator which utilizes transmission or delay lines or other electrical elements, the operation of which is governed by transmission line principles. It is generally known that a pulse having a width equal to twice the propagation time of a transmission line can be obtained at the sending end by terminating the sending and receiving ends in the characteristic impedance of the line and a short circuit, respectively, and applying a step function voltage waveform to the sending end through the impedance termination. However, such schemes can only provide a single sequence of clock pulses; and ordinarily two separate generators are required to provide a pair of out-of-phase clock pulse sequences. In addition, the amplitude of such signals will be only one-half that of the input signal.

Another object of the invention is to provide a novel and improved signal generator in which a pair of out-of-phase pulse sequences is provided from a single delay line.

Briefly, the present invention is embodied as a two phase pulse generator employing a delay line terminated at each end in its characteristic impedance. Input means alternately develops input voltage waveforms at first and second ends of the line while simultaneously connecting negligible impedance means across the second and first ends, respectively. First and second output means connected to the first and second ends, respectively, receive first and second out-of-phase output pulse waveforms having pulse widths equal to twice the propagation or delay time of the line. In the illustrated embodiment of the invention, the input means includes first and second transistor switches which respond to input signal edges to alternately provide step function voltages at the first and second ends while simultaneously short circuiting the opposite ends.

Figure 2:
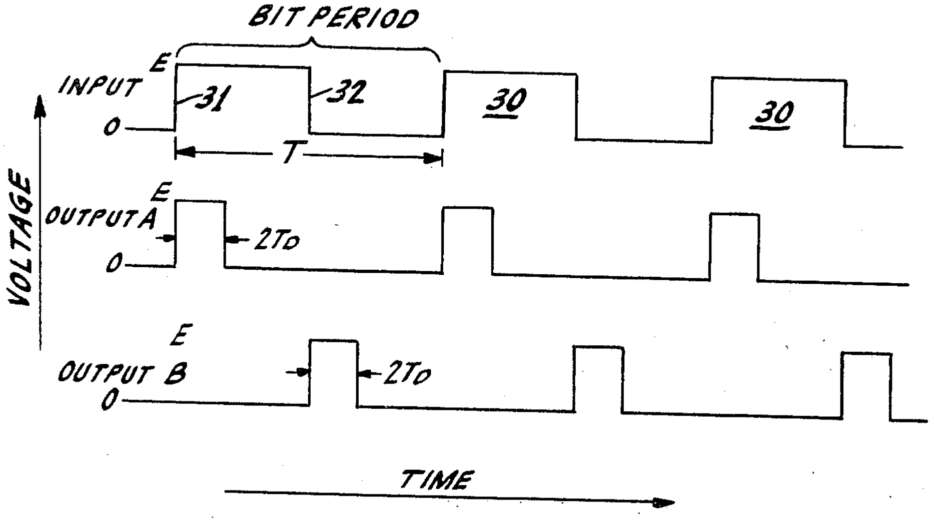

In the drawing:

FIG. 1 is a schematic circuit diagram of an exemplary two phase pulse generator according to the present invention; and FIG. 2 is a voltage versus time display of the input and output waveforms for the pulse generator in FIG. 1.

While not limited thereto, the present invention is contemplated for use in a digital system environment such as a data handling system. As mentioned previously the operation of such systems often employs the concept of bit periods. Referring now to FIG. 2, a bit period for a particular system may be arbitrarily defined by the period T of the square wave designated as INPUT. The square wave has, for example, a base of 0 volt and a signal swing to +E volts. For each bit period the INPUT waveform includes a pulse 30 of E volts amplitude and width of $T/2$. The leading edges 31 of the pulses 30 occur at the onsets of the bit periods; while the trailing edges 32 occur at the midpoints of the bit periods.

The signal generator of the present invention responds to the leading edges 31 of the input pulses 30 to provide a first output pulse sequence A and responds to the trailing edges 32 to provide a second output pulse sequence B. The A pulses occur at the onsets of the bit periods; while the B pulses occur at the midpoints of the bit periods.

Turning now to FIG. 1 for a detailed description of an exemplary signal generator according to the present invention, a delay element 10 is shown to have connections 11 and 12 and a common connection 13. The delay element 10 may be any suitable device which operates in accordance with the principles of a transmission line. Hence, the delay element 10 may be a coaxial cable or a conventional delay line either of the lumped or distributed constant type. For purposes of illustration, the delay element 10 is arbitrarily designated in FIG. 1 as a delay line having a characteristic impedance $Z_0$ and a one-way propagation time or delay of $T_D$.

The common connection 13 is connected to a point of reference potential which is arbitrarily designated as circuit ground by the conventional symbol therefore in FIG. 1. The delay line connections 11 and 12, which represent the two ends of the line, are connected to a supply connection 15 by way of resistors R1 and R2, respectively. The resistors R1 and R2 each have a value substantially equal to the characteristic impedance $Z_0$ of the delay line 10.

A pair of switching devices illustrated as transistors Q1 and Q2 further connect the delay line ends 11 and 12, respectively, to a further supply connection 14. To this end the collector electrodes *1c* and *2c* are connected to the delay line ends 11 and 12, respectively, while the emitter electrodes *1e* and *2e* are connected to the supply connection 14. Connected between the supply connections 14 and 15 is a source 16 of D.C. operating potential polarized as illustrated and having a value of E volts. The supply connection 14 is arbitrarily considered to be the reference connection as illustrated by the ground symbol in FIG. 1.

The delay line ends 11 and 12 are further connected to output connections 17 and 18 by way of a pair of buffer devices illustrated as transistors Q4 and Q5, each connected in the common collector configuration. To this end the base electrodes *4b* and *5b* are connected to the delay line ends 11 and 12, respectively. The collector electrodes *4c* and *5c* are connected in common to the supply connection 15; while the emitter electrodes *4e* and *5e* are connected by way of resistors R4 and R5, respectively, to the supply connection 14. The emitter electrodes *4e* and *5e* are further connected to the output connections 17 and 18, respectively. The output pulse trains or sequences A and B are developed at output connections 17 and 18, respectively.

The input circuit means for the switching transistors Q1 and Q2 includes an input source 23, a pair of inverting devices 19 and 21 and a further switching transistor Q3. The input source 23 has a common terminal 25 which is connected to the system reference and output terminal 24 which is connected in common to the inputs 20 and 22 of inverting devices 19 and 21, respectively. The output of inverting device 19 is connected to the base electrode 1*b* of switching transistor Q1. The output of the inverting device 21 is connected to the base electrode 3*b* of transistor Q3. The emitter electrode 3*e* is connected to the supply connection 14; while the collector electrode 3*c* is connected by way of resistor R3 to the supply connection 15. The collector electrode 3*c* is further connected to the base electrode 2*b* of switching transistor Q2.

The input source 23 includes appropriate circuitry such as an oscillator and shaping circuits to generate the regularly recurring INPUT waveform as illustrated in FIG. 2.

The inverting devices 19 and 21 and signal inverting transistor Q3 respond to the input waveform to provide complementary input signals to the base electrodes of switching transistors Q1 and Q2. Thus, inverter 19 provides a signal inversion of input pulses 30 to transistor Q1; while inverter 21 and signal inverting transistor Q3 combine to provide a double inversion or essentially no signal inversion of input pulses 30 to transistor Q2. The inverters 19 and 21 function primarily to insure that transistors Q1 and Q3 turn on and off together in the event that their $V_{BE}$'s (base-to-emitter voltage drops) are mismatched. Thus, inverter devices 19 and 21 preferably have well-defined thresholds and provide isolated or independent signals at their outputs in response to the same input signal. Various logic gate configurations, such as diode-transistor-logic, transistor-transistor-logic, resistor-transistor-logic, and others are suitable for this purpose. The function of inverters 19 and 21 is accordingly one of isolation and could just as well be implemented with noninverting devices having well-defined thresholds.

The complementary input signals to the base electrodes of transistors Q1 and Q2 provide a complementary ON-OFF mode of operation. That is, transistor Q1 is turned on when transistor Q2 is turned off and vice versa. The collector-to-emitter path of the ON transistor presents negligible impedance such that a substantial short circuit is provided between the associated delay line end and circuit ground; while the collector-to-emitter path of the OFF transistor presents a relatively high impedance between its associated delay line end and circuit ground. Consequently, that end of delay line 10 associated with an ON transistor is terminated in a short circuit, while the other end associated with an OFF transistor is terminated in the characteristic impedance of the line ($R1=R2=Z_0$).

The ON condition of transistor Q1 and the OFF condition of transistor Q2 corresponds, in the case where elements 19 and 21 are inverting devices, to the absence of input pulses 30, i.e., a voltage of 0 volt at the output terminal 24 of input source 23. The inverter devices 19 and 21 would normally invert the 0 volt input level to a relatively high voltage level. The base-to-emitter junctions of transistors Q1 and Q3, however, essentially clamp the output signals from these devices to a voltage equal to the base-to-emitter voltage drops of the transistors. Under this condition base current is supplied to each transistor which is approximately equal in value to the short-circuit output current of inverter devices 19 and 21. Transistors Q1 and Q3 are therefore turned on. With transistor Q3 turned on, the base and emitter electrodes of transistor Q2 are both at substantially ground potential so that transistor Q2 is turned off. With transistor Q2 turned off, the delay line end 12 is terminated by resistor R2 which is equal to the characteristic impedance $Z_0$. The other end 11 of the delay line, however, is terminated in a short circuit due to the negligible impedance presented by the collector-to-emitter path of the ON transistor Q1. Thus, delay line end 11 is at a voltage of substantially 0 volt. Assuming that the D.C. resistance of the delay line 10 is negligible, the delay line end 12 is also at a voltage of substantially 0 volt. The current flowing in the collector electrode of transistor Q1 under these conditions is $E/R1+E/R2$, or $2E/Z_0$ $(R1=R2=Z_0)$ amperes.

When a leading edge 31 of the input waveform occurs, the output terminal 24 of the input source 23 changes from 0 to +E volts. This signal transition is inverted by inverters 19 and 21 to turn both transistor Q1 and Q3 off. When transistor Q3 turns off, the current flowing through resistor R3 is diverted to the base electrode of transistor Q2, thus turning transistor Q2 on. When transistor Q1 turns off, its collector current changes from $2E/Z_0$ to 0 amperes. This current change is applied to an impedance of $Z_0/2$ (R1 in parallel with $Z_0$). The collector voltage of transistor Q1 therefore changes from 0 to +E volts, thereby applying a step function voltage or a voltage transition to the delay line end 11 and to the base electrode of buffer transistor Q4. Buffer transistor Q4 translates this step function voltage transmission to the output connection 17 which in turn changes from 0 to substantially +E volts. The 0 to +E volts transition propagates along the delay line 10 to the opposite end 12 which is now terminated in a short circuit due to the ON condition of transistor Q2. The voltage transition is inverted and reflected at the short circuited end 12 and propagates along the line 10 back toward the end 11. After a round-trip delay of $2T_D$, the reflected and inverted transition arrives at the delay line end 11 and is absorbed in the characteristic impedance termination of resistor R1 to return the end 11 to a voltage of 0 volt. The reflected voltage transition is also translated by buffer transistor Q4 to the output connection 17 whereby the output voltage changes from substantially +E volts to 0 volt. Thus, the signal generator responds to a leading edge 31 of the input waveform to provide at the output connection 17 a pulse having a leading edge concurrent with the leading edge 31, an amplitude of substantially E volts, and a width which is twice the one-way propagation time of the delay line 10.

When a trailing edge 32 of the input pulse 30 occurs, the voltage level at output terminal 24 reverts from +E volts to 0 volt. The +E volts to 0 volt transition is inverted by inverters 19 and 21 to turn transistors Q1 and Q3 on and transistor Q2 off. The delay line end 12 now rises from 0 to +E volts. This voltage transition propagates down the delay line 10 and is inverted and reflected at the short circuit termination (collector-to-emitter path of transistor Q1) at end 11. The inverted and reflected voltage transition arrives at the delay line end 12 after a round-trip delay of $2T_D$ and is absorbed by the characteristic impedance termination R2 to return the end 12 to 0 volt. These two voltage transitions at the delay line end 12 are coupled by buffer transistor Q5 to the output connection 18 to provide a B pulse having an amplitude of E volts and a width of $2T_D$. Thus, the signal generator responds to a trailing edge 32 of an input pulse 30 to provide at its output connection 18 a pulse having a leading edge concurrent with the trailing edge 32, an amplitude of substantially E volts, and a width of $2T_D$.

Successive input pulses 30 cause the signal generator to operate in a repetitive manner to provide the output pulse sequence A at output connection 17 and the output pulse sequence B at the output connection 18. With the INPUT waveform being a square wave, the output pulse sequences A and B are 180° out-of-phase such that the A pulses occur at the beginnings of the bit periods and the B pulses occur at the midpoints of the bit periods. Of course, if noninverting type devices are utilized in place of the inverters 19 and 21, the B pulses would occur at the beginnings of the bit periods and the A pulses would occur at the midpoints of the bit periods.

The relative phasing of the output pulse sequences A and B is a function of the symmetry of the INPUT waveform. When the input pulses 30 are formed from a square wave, the output pulse sequences are 180° out-of-phase. Various other phasings can be obtained by varying the symmetry of the pulses 30, as for example, by making the time between input pulses greater or lesser than the input pulse duration or width.

The buffer transistors Q4 and Q5 provide isolation between the delay line ends 11 and 12 and the output connections 17 and 18, respectively. The transistors Q4 and Q5 tend to isolate the delay line ends 11 and 12 from loads which have low INPUT impedances. Significant loading could have substantial effects on the characteristic impedance termniation of the delay line 10.

A noteworthy feature of the invention is that the output pulse widths are independent of inherent circuit delays. The output pulse widths are strictly a function of the delay line characteristics which are, relatively speaking, stable and reliable throughout a wide range of environmental conditions.

Although the invention has been illustrated with transistors of the NPN type, it is apparent that transistors of the PNP type can be employed provided that other appropriate circuit changes are made. In addition, it is apparent that switching circuits other than transistor switching circuits can be employed to provide the short circuit terminations and input voltage transitions to the delay line.

What is claimed is:

1. A pulse generator for providing first and second output pulse sequences at first and second ends, respectively, of a delay line, said generator comprising input signal means for providing first and second input voltage transitions, first means responsive to said first input transitions to terminate said first end in the characteristic impedance of said line while simultaneously developing thereat the leading edges of said first ouput pulses, said second means responsive to said second input transitions to terminate said second end in the characteristic impedance of said line while simultaneously developing thereat the leading edges of said second output pulses, said first and second means further being responsive to said second and first input transitions, respectively, to terminate said first and second ends, respectively, in a short circuit whereby the trailing edges of said first and second output pulses are formed by the reflected and inverted forms of the corresponding leading edges of said first and second output pulses.

2. The invention according to claim 1 wherein said first and second means each include a resistor substantially equal in value to the characteristic impedance of said line and a switching device having a switching path of negligible impedance when turned on and high impedance when turned off.

3. The invention according to claim 2 wherein each said resistor is connected in circuit with the associated end of said line and a source of operating potential, wherein said first and second means responds to said first input transitions to turn their associated switch means off and on, respectively, and wherein said first and second means respond to said second input transitions to turn their associated switch means on and off, respectively.

4. The invention according to claim 3 wherein each said switch means comprises a transistor having a collector-to-emitter path corresponding to said switching path and an input electrode, wherein at least one of said first and second means includes signal inversion means, and wherein said first and second means respond to said first and second input transitions to apply complementary switching signals to the input electrodes of said transistors so that one transistor is on while the other is off and vice versa.

5. The invention according to claim 4 wherein two output buffers are provided, one said buffer being coupled to said one end of the line and the other said buffer being coupled to said other end of the line.

6. The invention according to claim 5 wherein each said output buffer comprises a further transistor connected in the common collector configuration.

References Cited

UNITED STATES PATENTS

| | | | |
|---|---|---|---|
| 2,605,449 | 7/1952 | Schrader | 328—67 XR |
| 3,252,100 | 5/1966 | Webb | 328—67 |

ARTHUR GAUSS, *Primary Examiner.*

STANLEY D. MILLER, *Assistant Examiner.*

U.S. Cl. X.R.

307—269, 293; 328—55, 62, 63